Dec. 26, 1944. J. WILSON 2,366,079
TOOL POST
Filed March 10, 1942
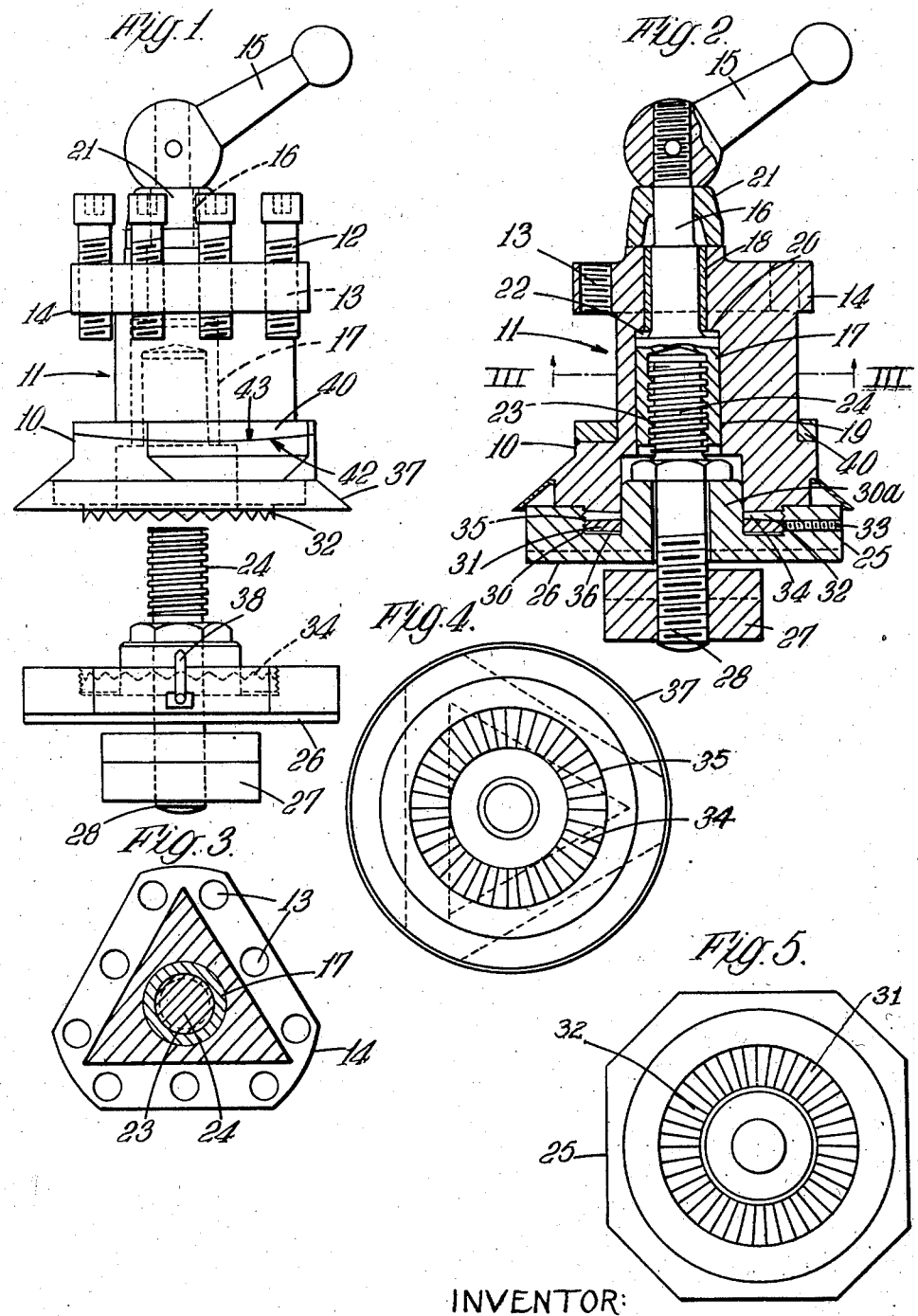
INVENTOR:
JOHN WILSON
BY Haseltine Lake & Co.
ATTORNEYS Patented Dec. 26, 1944

2,366,079

UNITED STATES PATENT OFFICE 2,366,079

TOOL POST

John Wilson, Exhall, Coventry, England

Application March 10, 1942, Serial No. 434,029
In Great Britain March 12, 1941

2 Claims. (Cl. 29—49)

This invention relates to tool posts for lathes, planing, shaping and like machines.

An object of the invention is the provision of a tool post having simple and accurate means for angular adjustment.

A further object resides in providing means by which a tool post can be rapidly released, adjusted and again secured in operative position.

Another object of the invention resides in the construction of a tool post which in its operative condition is entirely rigid and without play between the relatively adjustable parts.

Still another object of the invention is to provide a tool post which is adapted to carry a plurality of tools and having means for the vertical adjustment of the cutting edges without varying the position of the post.

Other objects and advantages of the invention will be clear from the following description of two preferred embodiments of the invention when read in conjunction with the annexed drawing.

In said drawing:

Figure 1 is a side elevation of one embodiment of tool post in accordance with the invention showing the block and base separated;

Figure 2 is a vertical section of the assembled block and base;

Figure 3 is a horizontal section on line III—III of Figure 2;

Figure 4 is a lower plan view of the block;

Figure 5 is an upper plan view of the base.

Like reference numerals denote like parts in the several figures.

The tool post comprises a block for supporting the tool or tools, a rotatable spindle on which the block is rotatably mounted, a base having means thereon co-operating with means on the block for locking said block in any one of a number of angularly adjusted positions, and means on said base co-operating with said spindle to cause the latter on operation to engage and disengage said locking means. Preferably the spindle, which is in threaded engagement with a rod secured to the base and extending upwardly therefrom, is formed with a shoulder which engages a shouldered bore in the block and thereby supports said block, the latter and the spindle being axially vertically movable with respect to the base on rotation of the spindle. The means for locking the block to the base preferably comprise inter-engaging teeth thereon which are employed in such number as to provide the desired angular adjustment of the block.

Referring now to the drawing, a block of steel or other suitable metal 10 is formed with recesses 11 for the reception of one or more tools. The block may be of square, triangular or other desired shape, depending on the number of tools which it is required to carry, and a recess 11 is formed in each of its side faces to accommodate a tool. In the present embodiment the block is shown as being triangular with rounded corners and is adapted to carry three tools which are secured within the recesses as by means of a plurality of screws 12 seated in threaded bores 13 in the upper part 14 of the block, three screws being shown associated with each recess.

The block 10 is formed with a central bore or passage extending vertically thereof and through which passes a spindle having an operating handle or crank 15 pinned or otherwise rigidly secured to its upper end. As illustrated, the upper part 16 of this spindle is of reduced diameter relative to the lower part 17 and the corresponding upper part of the block bore is provided with a bronze or other suitable bearing lining 18 within which the spindle is freely rotatable.

The lower enlarged end 17 of the spindle is positioned within an intermediate part 19 of the block bore and has an accurate machined fit therein. The shoulder 20 formed by the upper and intermediate portions of the bore, and a collar or washer 21 surrounding the upper end of the spindle and located between the operating handle 15 and the upper face of the block 10 jointly serve to hold the spindle against vertical movement within the block. An anti-friction washer 22 is shown interposed between the shoulder 20 and the upper face of the lower spindle portion 17. Instead of threading the operating handle 15 on the upper end of the spindle as shown in the drawings, a pair of lock nuts (not shown) may be interposed between the collar 21 and the handle to take the thrust, the handle having a loose fit over the spindle and being pinned thereto.

The lower enlarged end 17 of the spindle is internally threaded as shown at 23 to receive the correspondingly threaded upper end of a rod 24 rigidly secured to and projecting upwardly from a base plate 25 which in known manner may be formed with a tongue 26 on its underface adapted to cooperate with a groove in the frame of the machine to which the post is fitted, the base plate being slidable on said frame and having a locking member 27 carried on the lower threaded end 28 of the rod 24 by means of which said plate may be secured in the desired position. Alternatively, the base plate may be built into the machine, for which purpose it may be modified to suit the particular machine to which the post is to be fitted.

Formed in the upper face of the base plate and concentrically with respect to the rod 24 is an annular recess 30 within which is firmly secured, for example, by being threaded therein, a ring 31 having a plurality of radial teeth 32 formed on its upper face. A grub screw 33 is provided in the base plate to secure the ring in position therein. The teeth 32 are located below the plane of the upper face of the base plate which as shown in Fig. 2 forms a flat bearing face on which the lower edge portion of the block is normally supported and, in the operative position of the post, said teeth co-operate with corresponding teeth 34 provided on the lower face of a spigot 35 depending from the block 10. A boss 30a on the base plate and adapted to seat in a recess in the block forming the lower end of the block bore is preferably provided to ensure accurate axial alignment of the block with the base plate and proper bedding in of the teeth. One or more adjusting shims 36 may, if required, be inserted in the annular recess 30 so as to locate the ring 31 axially in proper position with respect to the block.

Any number of teeth may be provided on the ring 31 and block 10 depending on the nature of the desired adjustment of the post when in use. In the illustrated embodiment twenty four teeth are provided on each of these elements, giving a minimum angular adjustment for the block of 15°. A cover 37 which is indexed according to the degree of adjustment provided is sprung or otherwise secured on the lower end of the block and serves to prevent dust and other extraneous matter from entering the recess 30 in the base plate and between the co-operating teeth. A pointer 38 for indicating the setting of the block in co-operation with the scale on the cover plate, is provided on the base plate.

From the foregoing it will be seen that the block which, in the embodiment described, is designed to carry three tools, is capable of adjustment to any one of twenty four different positions. When it is desired to adjust the position of the block on the post in order to vary the operative position of a tool or to bring another tool on the block into operation, the operating handle 15 is rotated to turn the spindle in a direction to raise the latter relative to the threaded rod 24 and the base plate. The upper face of the lower enlarged part of the spindle, by reason of its engagement with the shoulder 20 of the block bore, lifts the block and disengages the teeth 34 from the toothed ring 31, after which the block can be turned to the desired angular position and then locked by rotating the operating handle in the opposite direction to bring the teeth 32, 34 into mesh without there being any possibility of play between the teeth, while the lower face of the block seats on the upper face of the base plate.

In order that the cutting edges of the tools may be adjusted as to height, the lower faces of the recesses 11 may be inclined. Alternatively, the lower portion of the block may be fitted with "rocker" members forming the lower faces of the recesses. Each rocker member, as shown, may be conveniently formed by an element 40 having a plane upper face 41 for engaging the tool and a convexly curved lower face 42 co-operating with a correspondingly curved concave face 43 of the block. The elements 40 are capable of angular adjustment relative to the block and the locking screws are similarly adjusted to hold the tools securely against the flat face of said elements.

To simplify the operation of adjusting or resetting the block, the inter-engaging portions 17, 24 of the spindle and rod are preferably formed with double start threads so that a relatively quick upward and downward movement of the block is ensured upon rotation of the operating handle.

Instead of recessing the base plate to receive the toothed ring 31, the latter may be fitted within a similar recess at the lower end of the block, a toothed spigot being provided on the base plate. Alternatively, both sets of teeth 32, 34 may be formed on rings adapted to be screwed into threaded recesses in the block and base plate respectively. The teeth may be of any cross-sectional shape but are preferably V-shaped with their sides and base forming apex angles of 90°. The teeth furthermore may be straight or bevelled, a small face angle of about 4° being sufficient in the latter case. Spiral-bevel or helical teeth may also be employed if desired.

The arrangement may be such that, when the post is applied to, for example, a lathe, the base plate may be dispensed with and the top slide of the lathe (or cross slide of other machine) is adapted to receive the block 10, the lower end 28 of the rod 24 being secured in said slide. In such cases, the machine slide could be recessed and provided with a gear ring similar to the gear ring 31 shown in the drawing or, if desired, the slide could be formed with a spigot having teeth cut therein to co-operate with the teeth on the block.

What I claim and desire to secure by Letters Patent of the United States is:

1. A tool post comprising a spindle, a body member for supporting a tool or tools mounted on said spindle and held against axial movement relatively thereto, a base member on the upper face of which the body is normally supported, a rod on said base member having a threaded portion co-operating with a threaded portion on said spindle, a boss on said base member engageable within a recess in the body member to guide and centre said body member, an axially adjustable ring seated within a recess in said base member surrounding said boss and having an annular series of teeth thereon, a second annular series of teeth on said body member engageable with the teeth on said ring to locate and lock said body member on said base member in any one of a plurality of angularly adjusted positions, and means for producing relative rotation of said spindle and rod to engage and disengage said annular series of teeth thereby to permit angular adjustment of said body member relatively to said base member.

2. A tool post comprising a spindle, a body member for supporting a tool or tools mounted on said spindle and held against axial movement relatively thereto, a base member on the upper face of which the body is normally supported, a rod on said base member having an externally threaded portion co-operating with an internally threaded portion on said spindle, a boss on said base member engageable within a recess in the body member to guide and centre said body member, a ring on either said body or base member having an annular series of teeth engageable with an annular series of teeth on the other of said members to locate and lock said body member on said base member in any one of a plurality of angularly adjusted positions, means for axially adjusting the ring relatively to the member to which it is attached, means for securing said ring in axially adjusted position, and means for producing relative rotation of said spindle and rod to engage and disengage said annular series of teeth thereby to permit angular adjustment of said body member relatively to said base member.

JOHN WILSON.